United States Patent
Wang

(10) Patent No.: US 8,402,987 B2
(45) Date of Patent: Mar. 26, 2013

(54) SCHRADER VALVE/PRESTA VALVE DUAL-MODE VALVE CAP

(75) Inventor: Lopin Wang, Taichung (TW)

(73) Assignee: Beto Engineering and Marketing Co., Ltd., Taichung (TW)

( * ) Notice: Subject to any disclaimer, the term of this patent is extended or adjusted under 35 U.S.C. 154(b) by 209 days.

(21) Appl. No.: 13/077,279

(22) Filed: Mar. 31, 2011

(65) Prior Publication Data

US 2012/0080099 A1    Apr. 5, 2012

(30) Foreign Application Priority Data

Sep. 30, 2010   (TW) ............................... 99133337 A

(51) Int. Cl.
*F16K 15/20*    (2006.01)
(52) U.S. Cl. ............... 137/223; 137/231; 251/149.1
(58) Field of Classification Search ............ 137/223, 137/227, 228, 230–233, 798; 251/149.1, 251/149.4, 149.5; 285/353–355; 152/415
See application file for complete search history.

(56) References Cited

U.S. PATENT DOCUMENTS

| | | | | |
|---|---|---|---|---|
| 1,198,205 A | * | 9/1916 | Engstrom | 137/231 |
| 1,789,306 A | * | 1/1931 | Ewald | 137/223 |
| 1,918,689 A | * | 7/1933 | Crowley | 137/223 |
| 5,638,865 A | * | 6/1997 | Wu | 137/223 |
| 5,645,100 A | * | 7/1997 | Chuang et al. | 137/223 |
| 5,683,234 A | * | 11/1997 | Chuang et al. | 137/223 |
| 5,921,269 A | * | 7/1999 | Wu | 137/223 |

* cited by examiner

*Primary Examiner* — Craig Schneider
*Assistant Examiner* — Craig J Price
(74) *Attorney, Agent, or Firm* — Muncy, Geissler, Olds & Lowe, PLLC

(57) ABSTRACT

A Schrader (American) valve /Presta (French) valve dual-mode valve cap includes a casing having an axle hole and a through hole kept in communication, a rotating device rotatably mounted in the axle hole and having two opposing heads respectively disposed outside the axle hole with a respective screw hole defined therein for the connection of a Schrader (American) valve or Presta (French) valve, an accommodation chamber in communication between the two screw holes, an annular air passage defined in between the rotating device and the casing, a through hole in communication with the annular air passage and the accommodation chamber and two seal rings mounted on the periphery thereof at two sides of the annular air passage, a valve block movable back and forth in the accommodation chamber and having a seal ring mounted on the periphery thereof to divide the accommodation chamber into two spaces, and a spring member stopped between the valve block and a part of the rotating device to force the valve block toward the screw hole for Schrader (American) valve.

10 Claims, 4 Drawing Sheets

SCHRADER VALVE/PRESTA VALVE DUAL-MODE VALVE CAP

BACKGROUND OF THE INVENTION

1. Field of the Invention

The present invention relates to air valve caps for inflation apparatus and more particularly, to a Schrader (American) valve /Presta (French) valve dual-mode valve cap.

2. Description of the Related Art

The most commonly seen air valves are the Schrader valve and the Presta valve. The Schrader valve is also called American valve having an outer diameter 8 mm and used on virtually every motor vehicle in the world today. The Presta valve is also called Sclayerand valve or French valve having an outer diameter 6 mm and commonly found in high pressure road style and many mountain bicycle inner tubes. These two types of air valves are different in diameter and structure and use a different valve cap. To solve this problem, dual-mode valve caps were created. Conventional dual-mode valve caps commonly have an American valve and a French valve arranged in parallel at one end and a lever located on the other end. When the air valve of the inflatable object to be inflated is connected to the American valve or French valve, operate the lever to squeeze a rubber socket in the dual-mode valve cap, thereby elastically deforming the rubber socket and forcing the elastically deformed rubber socket to seize the air valve of the inflatable object. These dual-mode valve caps further include a manual or automatic air passage switching mechanism to match the air valve inflation operation. These conventional dual-mode valve caps commonly have a complicated structure and large size, and require a large operation space. Further, the air valve of the inflatable object may be disconnected from the rubber socket accidentally during the inflation operation.

SUMMARY OF THE INVENTION

The present invention has been accomplished under the circumstances in view. It is the main object of the present invention to provide a Schrader (American) valve /Presta (French) valve dual-mode valve cap, which has a simple structure and compact size and avoids disconnection during use.

To achieve this and other objects of the present invention, a Schrader (American) valve /Presta (French) valve dual-mode valve cap includes a casing, a rotating device, a valve block and a spring member. The casing comprises a body shell, an axle hole extending through two opposing ends of the body shell, an end portion outwardly extended from the periphery of the body shell and a through hole cut through the end portion in communication with the axle hole. The rotating device is rotatably accommodated in the axle hole of the body shell of the casing, the rotating device comprising two opposing heads respectively disposed outside the axle hole for grasping by a hand of a person, each head defining therein a screw hole, the screw hole of one head being adapted for receiving a Presta (French) valve, the screw hole of the other head being adapted for receiving a Schrader (American) valve, an accommodation chamber disposed in communication between the screw hole of each of the two opposing heads, an annular air passage defined in the axle hole in between the periphery of the rotating device and the body shell of the casing corresponding to the end portion, two seal rings respectively mounted on the periphery thereof at two opposite lateral sides of the annular air passage and a through hole in communication between the annular air passage and the accommodation chamber. The valve block is accommodated in the accommodation chamber inside the rotating device and movable back and forth therein, comprising a seal ring mounted on the periphery near the inner end thereof and stopped against an inside wall of the rotating device to divide the accommodation chamber into two spaces and to isolate the two screw holes of the heads of the rotating device from each other and a pin located on one end hereof and aimed at the screw hole of the rotating device for Schrader (American) valve. The spring member is mounted in the accommodation chamber of the rotating device and stopped between an inner end wall of the screw hole of the rotating device for Presta (French) valve and an inner end wall of the valve block to impart a pressure to the valve block toward the screw hole of the rotating device for Schrader (American) valve and to let the seal ring of the valve block be kept between the through hole of the rotating device and the screw hole of the rotating device for Schrader (American) valve. When a Schrader (American) valve is fastened to the screw hole of the rotating device for Schrader (American) valve, the valve block is forced inwards to carry the seal ring thereof over the through hole of the rotating device to the space in between the through hole of the rotating device and the screw hole of the rotating device for Presta (French) valve.

DETAILED DESCRIPTION OF THE INVENTION

Figure 1:
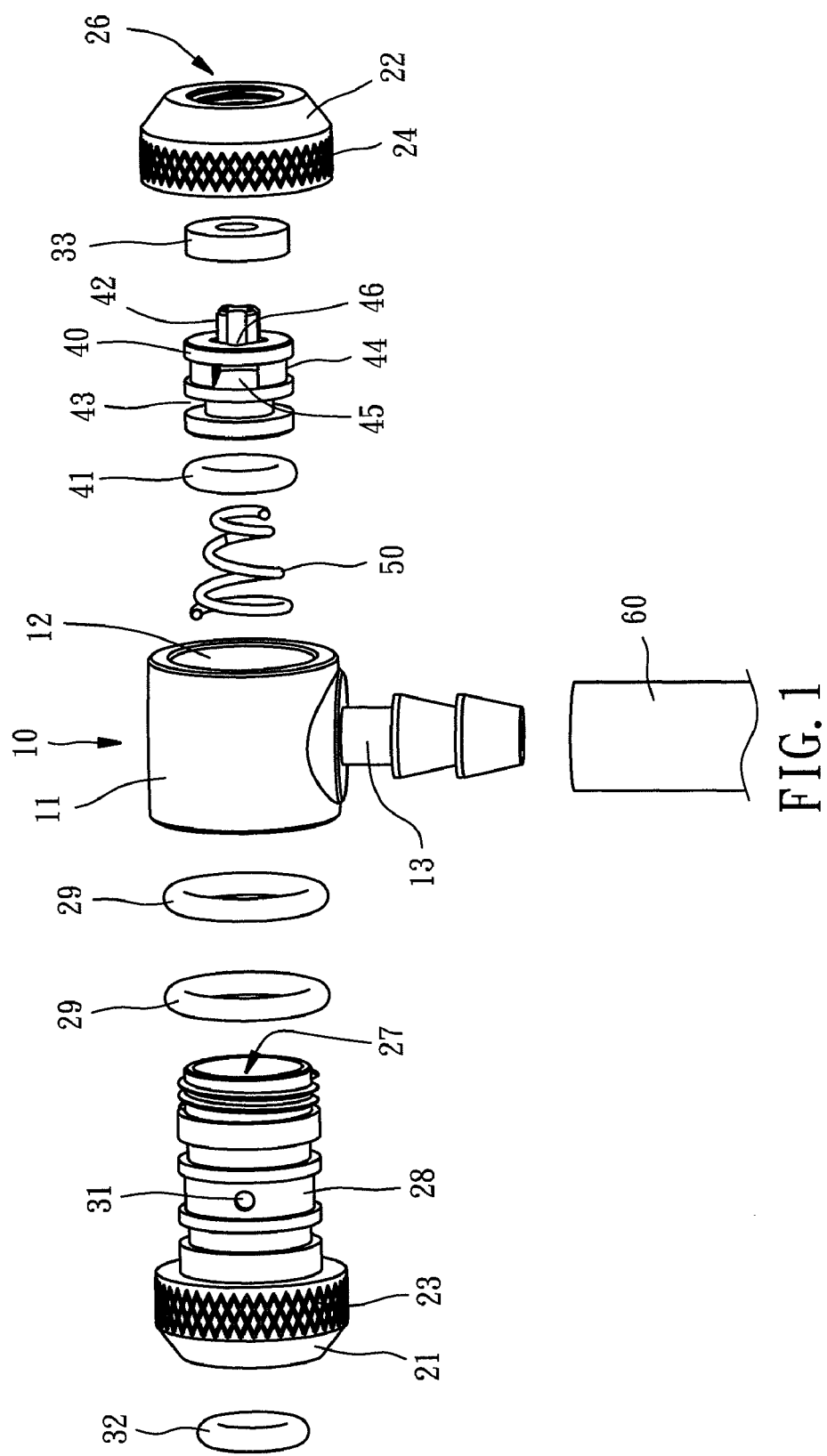
FIG. 1 is an exploded view of a Schrader (American) valve /Presta (French) valve dual-mode valve cap in accordance with the present invention.
Figure 2:
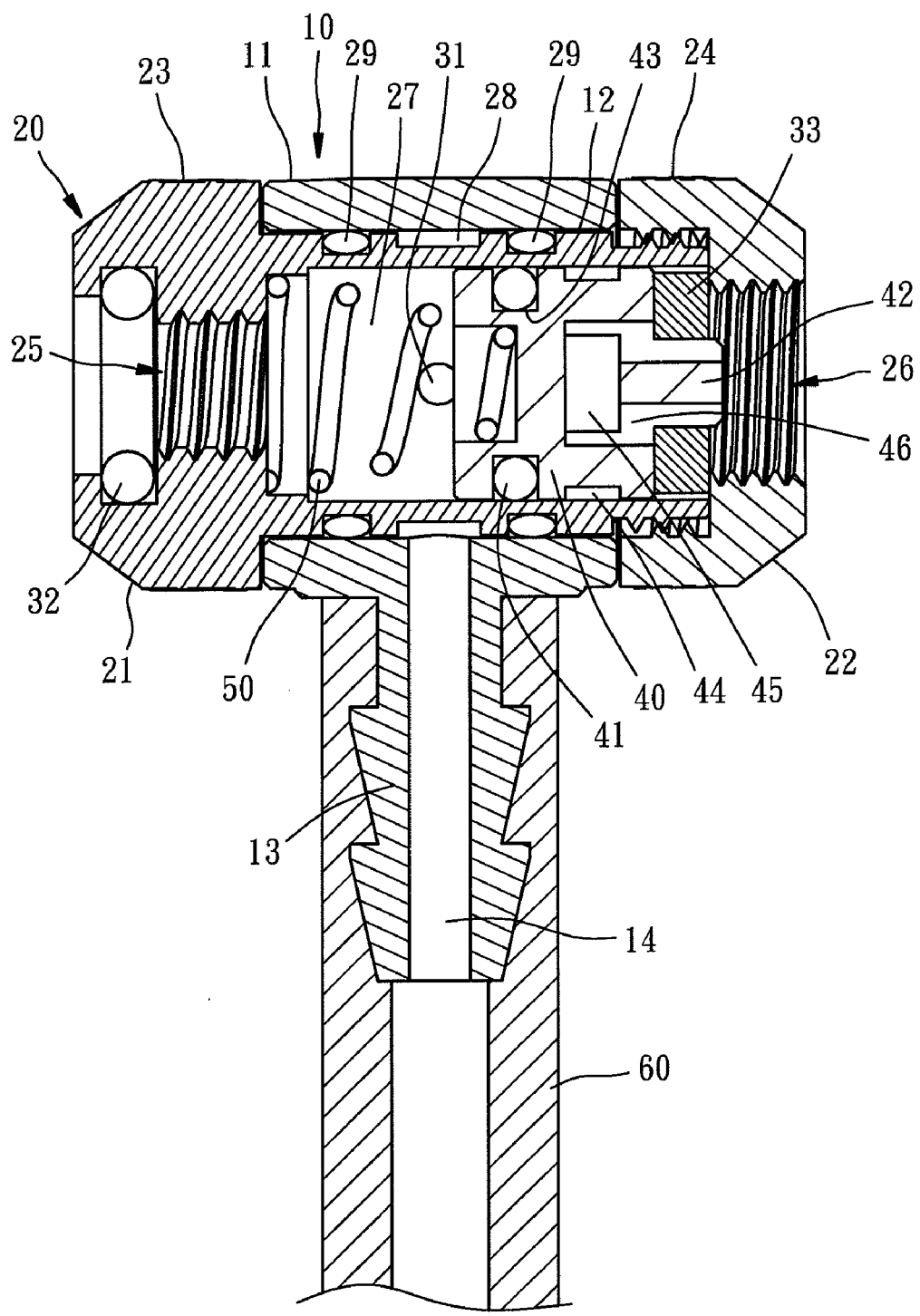
FIG. 2 is a sectional assembly view of the Schrader (American) valve /Presta (French) valve dual-mode valve cap in accordance with the present invention.

As shown in FIGS. 1 and 2, a Schrader (American) valve /Presta (French) valve dual-mode valve cap in accordance with the present invention is shown comprising a casing 10, a rotating device 20, a valve block 40 and a spring member 50.

The casing 10 comprises a body shell 11, an axle hole 12 extending through two opposing ends of the body shell 11, an end portion 13 perpendicularly extended from the periphery of the body shell 11, and a through hole 14 cut through the end portion 13 in communication with the axle hole 12.

The rotating device 20 is rotatably accommodated in the axle hole 12 of the body shell 11 of the casing 10, comprising two opposing heads 23; 24 respectively disposed outside the axle hole 12 for grasping by hand. The heads 22; 23 each have a screw hole 25 or 26. One screw hole 25 is adapted for receiving a Presta valve. The other screw hole 26 is adapted for receiving a Schrader valve. The rotating device 20 further defines therein an accommodation chamber 27 in communication between the two screw holes 25 and 26. The rotating device 20 is configured for accommodation in the axle hole 12 of the body shell 11 of the casing 10 in such a manner that an annular air passage 28 is defined in the axle hole 12 in between the periphery of the rotating device 20 and the inside wall of the body shell 11 of the casing 10 corresponding to the end portion 13. Two seal rings 29 are on the periphery of the rotating device 20 at two opposite lateral sides of the annular air passage 28 so that the annular air passage 28 is simply kept in communication with the through hole 14 in the end portion 13 of the casing 10. The rotating device 20 also defines a through hole 31 in communication between the annular air passage 28 and the accommodation chamber 27.

The valve block 40 is accommodated in the accommodation chamber 27 inside the rotating device 20 and movable back and forth therein, having a seal ring 41 mounted on the periphery near the inner end thereof. The seal ring 41 is stopped against the inside wall of the rotating device 20, thereby dividing the accommodation chamber 27 into two spaces and to isolate the two screw holes 25 and 26 from each other. The valve block 40 further comprises a pin 42 located on one end hereof and aimed at the Schrader (American) valve screw hole 26.

The spring member 50 is mounted in the accommodation chamber 27 of the rotating device 20, having its one end stopped against the inner end wall of the Presta (French) valve screw hole 25 and its other end stopped against the inner end wall of the valve block 40 to impart a pressure to the valve block 40 toward the Schrader (American) valve screw hole 26. The seal ring 41 of the valve block 40 is disposed between the through hole 31 of the rotating device 20 and the Schrader (American) valve screw hole 26. When a Schrader (American) valve is fastened to the screw hole 26, the valve block 40 is forced inwards to carry the seal ring 41 over the through hole 31 to the space in between the through hole 31 and the Presta (French) valve screw hole 25.

During application, connect one end of a flexible tube 60 to the end portion 13 of the casing 10 and the opposite end thereof to an external air source (not shown), such as handheld air pump, foot air pump, carbon dioxide cylinder or air compressor. Alternatively, the Schrader (American) valve /Presta (French) valve dual-mode valve cap can be directly connected to a handheld air pump.

The operation of the Schrader (American) valve /Presta (French) valve dual-mode valve cap will be described hereinafter with reference to FIGS. 3 and 4.

Figure 3:
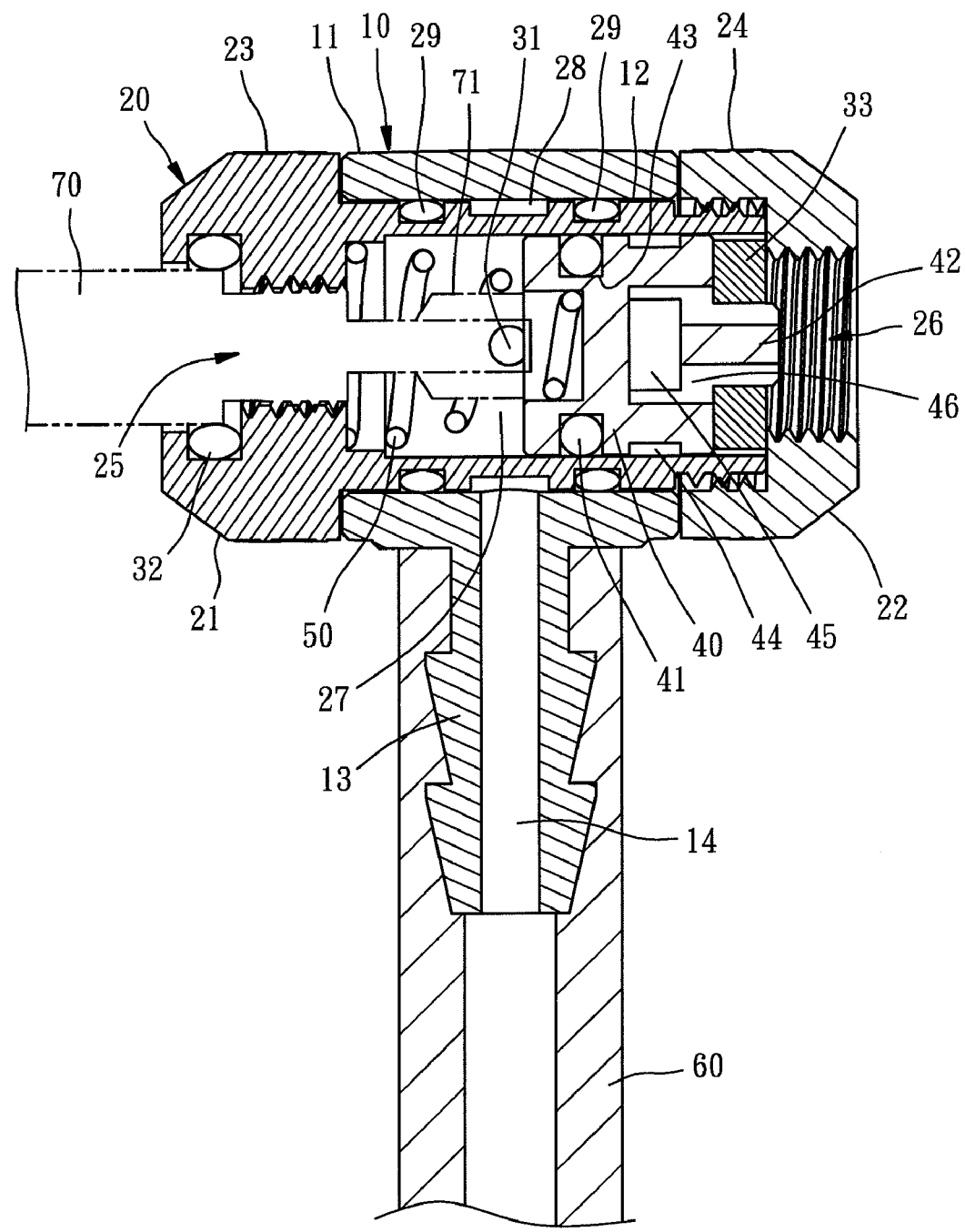
FIG. 3 is similar to FIG. 2, illustrating an inflation operation after installation of a Presta (French) valve.

As shown in FIG. 3, when a Presta (French) valve 70 (see the imaginary line) is connected to the screw hole 25, the user must loosen the screw nut 71 of the Presta (French) valve 70 at first before inflation, and then attach the Presta (French) valve screw hole 25 to the Presta (French) valve 70, and then grasp the head 23 with the fingers to rotate the rotating device 20 and to further fasten tight the Presta (French) valve screw hole 25 to the Presta (French) valve 70 for inflation. During the air charging operation, compressed air goes through the flexible tube 60 into the annular air passage 28 via the through hole 14, and then goes through the through hole 31 into the accommodation chamber 27 to charge into the Presta (French) valve 70. In order to prevent air leakage through the gap in the screw joint, a seal ring 32 is mounted in the Presta (French) valve screw hole 25. When threading the Presta (French) valve 70 into the Presta (French) valve screw hole 25 toward the accommodation chamber 27, the Presta (French) valve screw hole 25 will give a pressure to the seal ring 32 gradually, causing deformation of the seal ring 32 to seal the gap.

Figure 4:
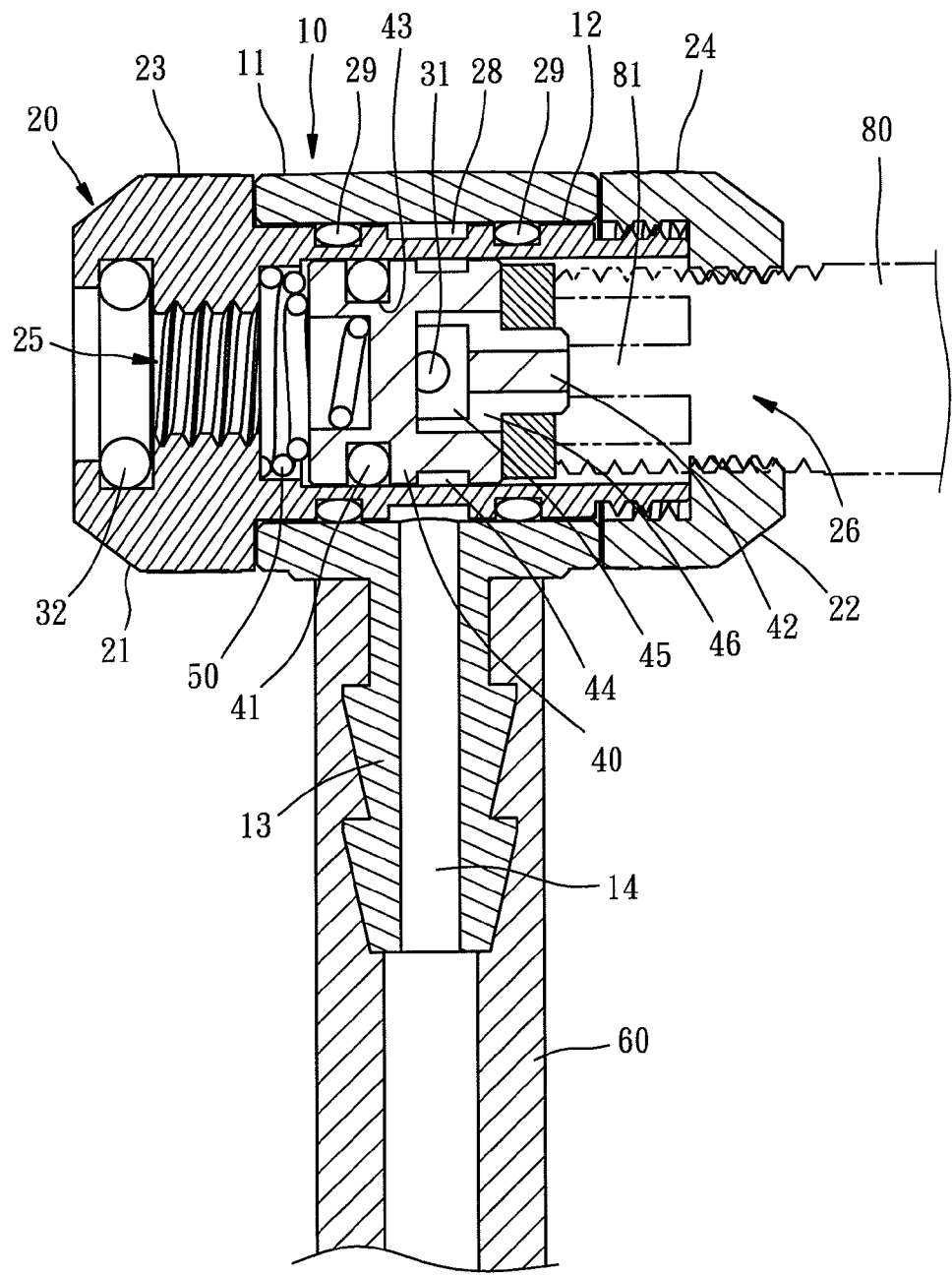
FIG. 4 is similar to FIG. 2, illustrating an inflation operation after installation of a Schrader (American) valve.

As shown in FIG. 4, when connecting a Schrader (American) valve 80 (see the imaginary line) to the screw hole 26, the user must attach the Schrader (American) valve screw hole 26 to the Schrader (American) valve 80, and then grasp the head 24 with the fingers to rotate the rotating device 20 and to further fasten tight the Schrader (American) valve screw hole 25 to the Schrader (American) valve 80. During rotation of the rotating device 20 relative to the Schrader (American) valve 80, the Schrader (American) valve 80 is moved toward the inside of the accommodation chamber 27 gradually to push the valve block 40 toward the Presta (French) valve screw hole 25, thereby moving the seal ring 41 over the through hole 31 for allowing communication between the annular air passage 28 and the Schrader (American) valve screw hole 26 via the through hole 31. At this time, the pin 42 of the valve block 40 is forced to push open the valve 81 of the Schrader (American) valve 80 for inflation. When the Schrader (American) valve 80 is disconnected after inflation, the spring member 50 immediately pushes the valve block 40 back to its former position as shown in FIGS. 2 and 3. In order to prevent air leakage through the gap in the screw joint, a gasket ring (pad) 33 is mounted in between the valve block 40 and the Schrader (American) valve screw hole 26. When threading the Schrader (American) valve 80 into the Presta (French) valve screw hole 26, the Schrader (American) valve 80 will touch the gasket ring (pad) 33 at first, forcing the gasket ring (pad) 33 against the valve block 40 to seal the gap.

Referring to FIG. 1 again, the rotating device 20 consists of a first member 21, which is made in the form of a screw bolt, and a second member 22, which is made in the form of a screw nut. The first member 21 has a tubular body and an expanded head at one end of the tubular body. The tubular body of the first member 21 is inserted through the axle hole 12 of the casing 10 and then screwed up with the second member 22. Thus, the head of the first member 21 and the second member 22 respectively form the two heads 23 and 24 of the rotating device 20. An adhesive, tight fitting or any other technique may be applied to enhance connection between the first member 21 and the second member 22. The inside space of the tubular body of the first member 21 forms the accommodation chamber 27 of the rotating device 20. A groove is formed on and extending around the periphery of the tubular body of the first member 21 to form the aforesaid annular air passage 28. A through hole is made in the annular air passage 28 to form the aforesaid through hole 31. Further, two annular grooves are respectively disposed at two opposite lateral sides relative to the annular air passage 28 for the mounting of the seal rings 29. Further, an annular groove 43 is formed on and extending around the periphery of the valve block 40 near its inner end for the mounting of the seal ring 41. Another annular groove 44 is formed on and extending around the periphery of the valve block 40 on the middle. A transverse through hole 45 is transversely formed in the periphery of the valve block 40 within the annular groove 44. A longitudinal through hole 46 is formed in the valve block 40 at one side of the pin 42 and kept in communication with the transverse through hole 45. As shown in FIG. 4, when the valve block 40 is moved inwards to the extent, the annular groove 44 of the valve block 40 is kept in communication with the through hole 31, and air entering the flexible tube 60 goes through the through hole 31 into the annular groove 44 and then into the inside of the Schrader (American) valve 80 through the transverse through hole 45 and the longitudinal through hole 46.

Thus, the invention has the characteristics of compact structure and small size, and requires less space during operation. Further, the screw-connection design of the invention avoids any valve connection errors. Even under a dim light or dark environment, the user can check the connection correctness by the sense of touch when rotating the rotating device with the fingers to fasten the air valve. Once the connection is done, the connection stability is assured for convenient use.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A Schrader (American) valve /Presta (French) valve dual-mode valve cap, comprising:

a casing comprising a body shell, an axle hole extending through two opposing ends of said body shell, an end portion outwardly extended from a periphery of said body shell and a through hole cut through said end portion in communication with said axle hole;

a rotating device rotatably accommodated in said axle hole of said body shell of said casing, said rotating device comprising two opposing heads respectively disposed outside said axle hole for grasping by a hand of a person, each of said head defining therein a screw hole, the screw hole of one said heads being adapted for receiving a Presta (French) valve, a screw hole of the other of said heads being adapted for receiving a Schrader (American) valve, an accommodation chamber disposed in communication between the screw hole of each of said two opposing heads, an annular air passage defined in said axle hole in between a periphery of said rotating device and said body shell of said casing corresponding to said end portion, two seal rings respectively mounted on the periphery of said rotating device at two opposite lateral sides of said annular air passage and a through hole in communication between said annular air passage and said accommodation chamber;

a valve block accommodated in said accommodation chamber inside said rotating device and movable back and forth therein, said valve block comprising a seal ring mounted on a periphery of said valve block and stopped against an inside wall of said rotating device to divide said accommodation chamber into two spaces and to isolate the two screw holes of the heads of said rotating device from each other and a pin located on one end of said valve block and aimed at the screw hole of said rotating device for the Schrader (American) valve;

a spring member mounted in said accommodation chamber of said rotating device and stopped between an inner end wall of the screw hole of said rotating device for said Presta (French) valve and an inner end wall of said valve block to impart a pressure to said valve block toward the screw hole of said rotating device for said Schrader (American) valve and to let the seal ring of said valve block be kept between the through hole of said rotating device and the screw hole of said rotating device for said Schrader (American) valve; and when said Schrader (American) valve is fastened to the screw hole of said rotating device for said Schrader (American) valve, said valve block is forced inwards to carry the seal ring of said valve block over the through hole of said rotating device to the space in between the through hole of said rotating device and the screw hole of said rotating device for said Presta (French) valve.

2. The Schrader (American) valve /Presta (French) valve dual-mode valve cap as claimed in claim 1, wherein said rotating device further comprises a seal ring mounted in the screw hole of said rotating device for Presta (French) valve.

3. The Schrader (American) valve /Presta (French) valve dual-mode valve cap as claimed in claim 1, wherein said rotating device further comprises a gasket ring mounted in the screw hole of said rotating device for said Schrader (American) valve.

4. The Schrader (American) valve /Presta (French) valve dual-mode valve cap as claimed in claim 1, wherein said rotating device consists of a first member and a second member.

5. The Schrader (American) valve /Presta (French) valve dual-mode valve cap as claimed in claim 4, wherein said first member comprises a tubular body inserted through said axle hole of said casing and screwed up with said second member at one side relative to said casing, and an expanded head located at one end of said tubular body and disposed at an opposite side relative to said casing, the expanded head of said first member and said second member forming the two opposing heads of said rotating member respectively.

6. The Schrader (American) valve /Presta (French) valve dual-mode valve cap as claimed in claim 5, wherein said tubular body of said first member surrounds said accommodation chamber and comprises an annular groove located on and extending around the periphery thereof to form said annular air passage.

7. The Schrader (American) valve /Presta (French) valve dual-mode valve cap as claimed in claim 4, wherein said first member comprises two annular grooves extending around the periphery at two opposite lateral sides of said annular air passages for the mounting of the two seal rings of said rotating device.

8. The Schrader (American) valve /Presta (French) valve dual-mode valve cap as claimed in claim 1, wherein said rotating device comprises an annular groove extending around the periphery thereof to form said annular air passage.

9. The Schrader (American) valve /Presta (French) valve dual-mode valve cap as claimed in claim 1, wherein said valve block comprises an annular groove extending around the periphery near the inner end of said valve block for the mounting of the seal ring of said valve block.

10. The Schrader (American) valve /Presta (French) valve dual-mode valve cap as claimed in claim 1, wherein said valve block comprises an annular groove extending around the periphery on a middle part of said valve block, a transverse through hole cut through the periphery in the annular groove thereof and a longitudinal through hole disposed at one side of said pin and kept in communication with said through hole.

* * * * *